(12) United States Patent
Barba et al.

(10) Patent No.: US 7,260,933 B2
(45) Date of Patent: Aug. 28, 2007

(54) METHOD FOR LIMITING A BOOST PRESSURE

(75) Inventors: Christian Barba, Fellbach (DE); Gunter Moll, Stuttgart (DE); Joachim Zeger, Winnenden (DE)

(73) Assignee: DaimlerChrysler AG, Stuttgart (DE)

( * ) Notice: Subject to any disclaimer, the term of this patent is extended or adjusted under 35 U.S.C. 154(b) by 38 days.

(21) Appl. No.: 11/221,390

(22) Filed: Sep. 7, 2005

(65) Prior Publication Data

US 2006/0021344 A1   Feb. 2, 2006

Related U.S. Application Data

(63) Continuation-in-part of application No. PCT/EP04/00384, filed on Jan. 20, 2004.

(51) Int. Cl.
| | |
|---|---|
| F02B 33/44 | (2006.01) |
| F02B 37/12 | (2006.01) |
| F02B 37/24 | (2006.01) |
| F02D 33/02 | (2006.01) |
| G06F 19/00 | (2006.01) |
| G06G 7/70 | (2006.01) |
| G01M 19/00 | (2006.01) |
| G01P 5/00 | (2006.01) |

(52) U.S. Cl. ............... 60/605.1; 701/100; 701/102; 73/118.1; 73/118.2; 60/602

(58) Field of Classification Search ............ 60/605.1, 60/611; 123/563, 564; 701/100–102; 73/118.1, 73/118.2

See application file for complete search history.

(56) References Cited

U.S. PATENT DOCUMENTS

| | | | | |
|---|---|---|---|---|
| 4,697,422 A | * | 10/1987 | Ueno et al. ............ | 60/602 |
| 4,849,897 A | | 7/1989 | Ciccarone ............. | 60/602 |
| 5,187,935 A | * | 2/1993 | Akiyama et al. ....... | 60/602 |
| 5,546,795 A | * | 8/1996 | Yamagishi ............. | 73/118.2 |
| 5,585,553 A | * | 12/1996 | Schricker ............. | 60/611 |
| 5,829,254 A | | 11/1998 | Hayashi et al. ........ | 60/602 |
| 6,298,718 B1 | * | 10/2001 | Wang ................... | 701/100 |
| 6,584,772 B2 | * | 7/2003 | Haupt et al. .......... | 60/602 |
| 6,644,029 B2 | * | 11/2003 | Weinreuter ............ | 60/602 |
| 6,983,597 B2 | * | 1/2006 | Wild et al. ........... | 60/611 |
| 7,032,382 B2 | * | 4/2006 | Onodera et al. ........ | 60/611 |
| 7,100,375 B2 | * | 9/2006 | Baize et al. .......... | 60/605.1 |
| 2005/0217647 A1 | * | 10/2005 | Wild et al. ........... | 123/563 |

(Continued)

FOREIGN PATENT DOCUMENTS

DE   100 54 843   5/2002

(Continued)

*Primary Examiner*—Thai-Ba Trieu
(74) *Attorney, Agent, or Firm*—K. Bach

(57) ABSTRACT

In a method for limiting a boost pressure of an internal combustion engine which is supercharged by the compressor of an exhaust gas turbocharger including a control unit in which a desired boost pressure value is compared with a limiting value and when the desired boost pressure value exceeds the limiting value, the boost pressure is limited to the limiting value, and the limiting value is determined by a simulation model in the form of a group of a characteristic curves established as a function of an existing operating state of the internal combustion engine, a temperature, a pressure ($p1$), and a air mass flow rate which occur upstream of a compressor of the exhaust gas turbocharger.

4 Claims, 4 Drawing Sheets

U.S. PATENT DOCUMENTS

2006/0288702 A1 * 12/2006 Gokhale et al. .............. 60/602

FOREIGN PATENT DOCUMENTS

| DE | 101 22 293 | 11/2002 |
| --- | --- | --- |
| FR | 2837527 A1 * | 9/2003 |
| JP | 57 052 338 | 3/1982 |
| WO | WO 01/29386 | 4/2001 |

* cited by examiner

METHOD FOR LIMITING A BOOST PRESSURE

This is a Continuation-In-Part Application of International Application PCT/EP04/000384 filed 20 Jan. 2004 and claiming the priority of German application 103 10 221.3 filed 8 Mar. 2003.

BACKGROUND OF THE INVENTION

The invention relates to a method for limiting a boost pressure of an internal combustion engine which is supercharged by means of a turbocharger, wherein a desired boost pressure is compared with a limit value which is determined for the various engine and turbocharger operating conditions and a gas mass flow rate upstream of the compressor of the turbocharger on the basis of a simulation model.

In particular in turbocharged diesel engines, the following principle of boost pressure control is used if the charger is not a so-called self-regulating charger. By means of a boost pressure sensor, which is arranged at a suitable location in the intake section, the current actual value of the boost pressure is continuously supplied to a control device, in particular a vehicle control unit or engine control unit. The control unit then continuously compares this boost pressure with a set value of the boost pressure in order to influence the boost pressure by means of a suitable actuator element in accordance with the magnitude and profile of the deviation of the set value from the actual value. The actuator element may be electrically and/or pneumatically operated. The boost pressure may be influenced, in particular, by adjustment at a waste gate of a turbine of an exhaust gas turbocharger or by variation of the turbine geometry, in particular, a variation of the position of the turbine guide vanes, depending on the type of exhaust gas turbocharger.

A desired value or desired values of the charge pressure are required for the regulating process. The desired value or the desired values are usually stored directly in the control unit as a function of the respective operating point, as a characteristic diagram or as a characteristic curve. The operating point is defined in particular by the engine speed and the engine load. The desired value can, if appropriate, be corrected for ambient influences or environmental influences such as, for example, temperatures and ambient pressure. The set value can, if appropriate, also be corrected dynamically or have a dynamic behavior in order to improve the transient response when rapid changes in the operating point occur.

When the desired values for the boost pressure are determined, it is necessary, in particular in full-load operating mode, to take into account various peripheral conditions which partially contradict one another. These peripheral conditions include, in particular:

The higher the boost pressure the more air or more gas is fed to the internal combustion engine and it can correspondingly output more torque and power.

If excessively high desired values are set for the boost pressures when there is a low air throughput rate at a compressor of the exhaust gas turbocharger—that is to say at low engine speeds—what is referred to as "pumping" of the compressor occurs. It is important to avoid this "pumping" for reasons of comfort, efficiency and durability of the exhaust gas turbocharger.

If excessively high set values for the boost pressures are set when there is a high air throughput rate at the compressor—that is to say at high engine speeds—over-speeding of the exhaust gas turbocharger occurs. Because of the risk of destruction of the exhaust gas turbocharger and possible further ensuing damage to the internal combustion engine, this state must be avoided under all circumstances.

The setting of excessively high boost pressures is also accompanied by a rise in the charge air temperature which occurs downstream of the compressor in the direction of flow. The charge air temperature should be limited depending on the particular design and the material used for the charge air passages extending to a charge air cooler which is provided in the intake duct. For example, elastomer hoses are used for the charge air passages. However, charge air system manufacturers only warrant their compressors up to a specific gas temperature at the compressor output, because, inter alia, of the temperature-dependent strength profile of the lightweight metal alloys which are used for the compressor wheel. At an excessively high temperature the compressor blades may otherwise be unacceptably stretched under the influence of the centrifugal forces at a high compressor speed and come into contact with the compressor casing, which could cause the turbocharger to fail.

Because of the physical conditions at the compressor, not only the boost pressure itself but also the compressor pressure ratio $p_2/p_1$—where the pressure $p_2$ represents the absolute pressure downstream of the compressor in the direction of flow and the pressure $p_1$ represent the absolute pressure in the intake section upstream of the compressor in the direction of flow—and the volume stream through the compressor are decisive for the risk of "pumping" the compressor and the risk of over-speeding of the exhaust gas turbocharger. This results from a typical compressor operating characteristic diagram which is represented by way of example in FIG. 1. In FIG. 1, the volume flow $dV_1/dt$ is plotted on the abscissa, and the pressure ratio $p_2/p_1$ is plotted on the ordinate. The curve a characterizes what is referred to as the pumping limit and the curve b characterizes the exhaust gas turbocharger rotational speed limit. In the rest of the description, more details will be given on FIG. 1. When the internal combustion engine is operating at a high altitude or with a soiled air filter associated with the intake section, the compressor pressure ratio $p_2/p_1$ rises as the absolute boost pressure $p_2$ remains constant since in both cases the pressure $p_1$ upstream of the compressor decreases. As a result, the risk of exceeding one of the two limits, the pumping limit or the exhaust gas turbocharger rotational speed limit, increases.

If the maximum boost pressures and thus the maximum boost pressure desired values are configured or selected on the basis of normal altitude and a clean air filter in such a way that the pumping limit and the exhaust gas turbocharger rotational speed limit can reliably be prevented from being exceeded even under the most unfavorable conditions, for example maximum altitude which can possibly be reached and air filter at the soiling limit, under normal conditions this would lead to unnecessary cutting of the possibly achievable torque values and power values of the internal combustion engine.

Instead, the boost pressure desired values in a control unit are typically corrected as a function of a correction variable. This correction variable may be, in particular, an atmospheric pressure or preferably, if a corresponding pressure sensor is provided upstream of the compressor in the intake section, it may be the pressure $p_1$ upstream of the compressor in the direction of flow. This makes it possible, under normal conditions, to permit higher boost pressures and thus generate also higher torque and higher power. The boost pressures are reduced for operation at a high altitude by means of a correction relating to the atmospheric pressure, or for operation at a high altitude and/or with soiled air filter by a correction relating to the pressure p1 which occurs upstream of the compressor in the direction of flow, and/or the atmospheric pressure in order to avoid "pumping" of the compressor and/or overspeeding of the exhaust gas turbocharger.

This is known from German laid-open patent application DE 100 54 843 A1. Here, the maximum acceptable boost pressure is determined as a function of a pressure upstream of a compressor p1 and temperatures upstream and downstream of the compressor in the intake tract, and as a function of the engine speed. In order to determine the maximum acceptable boost pressure, the relationship between the air charge and engine speed in the form of a characteristic curve is required. Such characteristic curves are usually determined in test bench trials on an internal combustion engine along the full-load under normal conditions and stored in a control device. If, for example, due to operation at a high altitude, the necessary desired value for the boost pressure is above the maximum acceptable boost pressure which is determined according to the disclosure of DE 100 54 843 A1 and stored in a control device, the control device will only set the maximum acceptable boost pressure within the scope of a minimum value selection. If, on the other hand, the maximum acceptable boost pressure limit is higher than the necessary desired value of the boost pressure, for example at normal altitude, this boost pressure is of course not limited by the maximum acceptable boost pressure limit.

The subject matter of German laid-open patent application DE 100 54 843 A1 ultimately attempts to depict the limiting curves for the pumping limit and the exhaust gas turbocharger rotational speed limit (see FIG. 1). The determination of the desired value for the boost pressure is based on a full-load characteristic curve for the air charge which is determined as an exemplary curve under normal conditions or on a full-load air charge profile which is determined by exemplary measurements under normal conditions and plotted over the rotational speed of the internal combustion engine and the corresponding pressures and temperatures or the corresponding state variables. Since the characteristic curve is determined by way of example on a test bench internal combustion engine or sample internal combustion engine under normal conditions along the full-load curve plotted against the rotational speed, values which are determined by means of the characteristic curve, for example a desired value for the boost pressure, may deviate from the values which are actually necessary since, in reality, the actual air charge value or air charge varies from one internal combustion engine to another (variation between different examples of the same type of engine), does not remain constant over the operating period as a result of soiling of the air-conducting parts (intake ducts, intake manifold etc.) and as a result of actuation or adjustment of the actuation times, for example as a result of lengthening of a valve drive operating chain or of a toothed belt, and also is dependent not only on the rotational speed but also on further internal-combustion-engine-related variables such as, for example, a load, a cooling water temperature, an exhaust gas backpressure which is relevant in particular when operating with a soot filter, and leakage of an exhaust gas recirculation valve if an exhaust gas recirculation system is provided. Such leakage is relevant in particular for conventional operation without full-load exhaust gas recirculation.

This list is not exclusive. If the criteria listed above are not taken into account, they must be accounted for by selecting the desired values for the boost pressures in such a way that a correspondingly large safety margin is maintained between the limits to be observed (pumping limit and rotational speed limit of the exhaust gas turbocharger, see FIG. 1) at the expense of the optimum rotational speed values and power output values. In particular the possible influence of the exhaust gas backpressure which, during operation with a soot filter, fluctuates within a very large range as a function of the momentary charging of the soot filter, makes appropriate use of the method disclosed in DE 100 54 843 more difficult for applications with a soot filter.

The successful use of a method for limiting the boost pressure which uses the air charge value curve or air charge curve of the internal combustion engine which is determined under full-load at normal altitude is also questionable at an altitude above the normal altitude since at an altitude above the normal altitude the full-load curve of the internal combustion engine corresponds to a lower load than at normal altitude because the charge is load-dependent. This load dependence is however less and less pronounced as the rotational speed increases. In addition, the operating points of the exhaust gas turbocharger which are changed as a result of the change in altitude also provide values for the exhaust gas backpressure which are different from those obtained at normal altitude. This also has an influence on the air charge value curve.

Furthermore, the method for limiting the boost pressure according to German laid-open patent application DE 100 54 843 A1 is unsuitable for internal combustion engines with full-load exhaust gas recirculation for the following reasons.

In the customary embodiment of an exhaust gas recirculation system, in particular in the form of what is referred to as a "high-pressure exhaust gas recirculation system", the exhaust gas is taken at a specific pressure upstream, in the direction of flow, of a turbine of the exhaust gas turbocharger located in the exhaust section, and is fed into the combustion air stream with a specific boost pressure downstream of a charge air cooler which is typically provided in the intake section. Opening the exhaust gas recirculation system when operating at full-load reduces both the stream of exhaust gas through the turbine and the stream of air through the compressor because part of the engine charge then is derived from the flow of exhaust gas which is recirculated and which is already branched off upstream of the turbine and returned to the intake air downstream of the compressor. In the disclosure in DE 100 54 843 A1 an exhaust gas recirculation system is neither provided nor taken into account.

Although an exhaust gas recirculation cooler can be provided in an exhaust gas recirculation line, the exhaust gas which is fed into the internal combustion engine from the exhaust gas duct via the recirculation system is typically hotter than the charge air downstream of the charge air cooler. As a result the fresh air is heated in the intake manifold or in the charge air distributor line. This constitutes a difference from operation without recirculation of exhaust gas. The heating of the charge air also causes the internal combustion engine to take in a smaller mass flow of gas. This in turn reduces the volume flow at the compressor.

DE 100 54 843 A1 does not disclose an exhaust gas recirculation line. If the method from DE 100 54 843 A1 were to be used in an internal combustion engine with exhaust gas recirculation, this would lead to a situation in which the compressor operating point would not be correctly detected at least with respect to the abscissa in the compressor characteristic diagram (FIG. 1). This could in turn lead to the limits for the "pumping" and/or the exhaust gas turbocharger limiting rotational speed being unintentionally exceeded.

Of course, air charge profiles which have been determined during operation with a specific exhaust gas recirculation rate which applies, for example, for normal conditions, could be stored in the control device. Any deviation from this exhaust gas recirculation rate, whether due to inaccuracies in the exhaust gas recirculation control or due to intentional reduction in the exhaust gas recirculation rate at an altitude higher than normal, would result in a change in the volume flow through the compressor which would not be detected or would not be taken into account by the characteristic diagram. This could result in the limits for "pumping" and/or the limiting rotational speed for the exhaust gas turbocharger being unintentionally exceeded. This would be avoided by selecting a boost pressure set value which ensures a correspondingly generous distance from these limits, however at the expense of reduced torque and thus reduced power.

An excessively large ratio between the boost pressure downstream of the compressor and pressure upstream of the compressor is also accompanied by a rise in the charge air temperature downstream of the compressor. The maximum permissible charge air temperature has to be limited depending on the design and material of the following charge air paths as far as the charge air cooler (for example elastomer hoses), for safety and durability reasons, but, if appropriate, also because of the charge air temperature limit for which the manufacturer of the supercharger has designed and warranted the compressor. The maximum value of this ratio, at which the maximum acceptable charge air temperature is exceeded, depends on several factors:

on the compressor volume flow rate which co-determines the compressor efficiency, on the efficiency of the compressor (compressors of, for example, a different design and "quality" may also have different characteristic efficiency diagrams) because the lower this efficiency the higher the charge air temperature at constant values of the compressor volume flow and the ratio of the boost pressure to the pressure upstream of the compressor, on the configuration of the charge air path from the compressor to the charge air cooler, in particular on the selection of material, and on the temperature upstream of the compressor because the higher said temperature the lower the ratio of boost-pressure to pressure upstream of the compressor at which the acceptable air charge temperature is reached or exceeded will be.

In applications in which there is a trend for the rotational speed limit of the exhaust gas turbocharger is rather high, the compressor efficiency is not very high, the, for example, material-based limitation of the charge air temperature are releasable lower and the anticipated areas of use include areas with high temperatures, (for example Death Valley in the USA with air temperatures of up to 60° C.), and the maximum desired boost pressures are comparatively high (that is to say especially in the case of what are referred to as "supercharged systems"), it may be found that, at least starting from a certain air temperature upstream of the compressor in the direction of flow, the maximum acceptable charge air temperature is reached earlier than the rotational speed limit for the exhaust gas turbocharger. Typically, the maximum acceptable boost pressures are limited more severely as a reserve or as a safety measure for situations where the ambient air or intake air than would be necessary because of the rotational speed limit of the exhaust gas turbocharger in order to protect the materials, for example elastomer hoses between the compressor and the charge air cooler or also to protect the compressor itself.

When the internal combustion engine is used at normal temperatures, this limitation would result in a boost pressure, torque and thus power of the internal combustion engine being limited more severely than would be necessary for this operating situation. As an alternative to limiting the boost pressure it is typically also possible to limit the ratio of boost pressure to pressure upstream of the compressor.

German laid-open patent application DE 101 22 293 A1 also discloses a method for controlling a boost pressure limitation of a turbocharger in an internal combustion engine in which the actual boost pressure is respectively determined after specific time internals and is compared with predefined values for the desired boost pressure in the respective operating state from a stored compressor characteristic performance graph, and adjusted.

There is however a disadvantage in that the temperature occurring upstream of the compressor is not taken into account when the maximum acceptable pressure ratio of the supercharger is determined—and thus also when the maximum acceptable boost pressure is determined. It is thus possible for the temperature occurring downstream of the compressor to exceed a maximum acceptable value, and for components such as, for example, elastomer hoses or the compressor itself, to be damaged under hot ambient conditions even before the maximum acceptable boost pressure for the rotational speed limit of the exhaust gas turbocharger is reached.

It is the object of the present invention to provide a method which is improved over the prior art methods, such that the boost pressure of an internal combustion engine which is supercharged by means of an exhaust gas turbocharger is limited under any condition only to the extent as required by those conditions.

SUMMARY OF THE INVENTION

In a method for limiting a boost pressure of an internal combustion engine which is supercharged by the compressor of an exhaust gas turbocharger including a control unit in which a desired boost pressure value is compared with a limiting value and when the desired boost pressure value exceeds the limiting value, the boost pressure is limited to the limiting value, and the limiting value is determined by a simulation model in the form of a group of a characteristic carves established as a function of an existing operating state of the internal combustion engine, a temperature, a pressure (p1), and a gas mass flow rate which occur upstream of a compressor of the exhaust gas turbocharger.

The method according to the invention is advantageously suitable for use in internal combustion engines with, in particular, an exhaust gas recirculation system which is active during full-load operation. Furthermore, by sensing specific influences or, respectively, interference variables, for example, variations in the air charge value for different internal combustion engines, the reduction in the air charge value over the operating period or changes in the exhaust gas back pressure when operating with a soot filter in the exhaust section, the safety of the boost pressure limit which is determined by the pumping limit and the rotational speed limit of the exhaust gas turbocharger can be reduced, as a result of which a high boost pressure and thus a high torque and a high power level can be achieved together with a reliable protection of the exhaust gas turbocharger.

Furthermore, the method according to the invention reliably avoids the risk of the compressor or the charge air lines being damaged by unacceptably high charge air temperatures even below the maximum acceptable rotational speed for the exhaust gas turbocharger, that is to say below the point where a boost pressure limiting means which functions according to the prior art would be activated.

The method according to the invention for limiting a boost pressure of an internal combustion engine is preferably used in internal combustion engines which are intended for use in means of transportation, in particular in motor vehicles.

The invention will become more readily apparent from the following description of exemplary embodiments which are described below with reference to the accompanying drawings:

DESCRIPTION OF THE PREFERRED EMBODIMENTS

Figure 1:
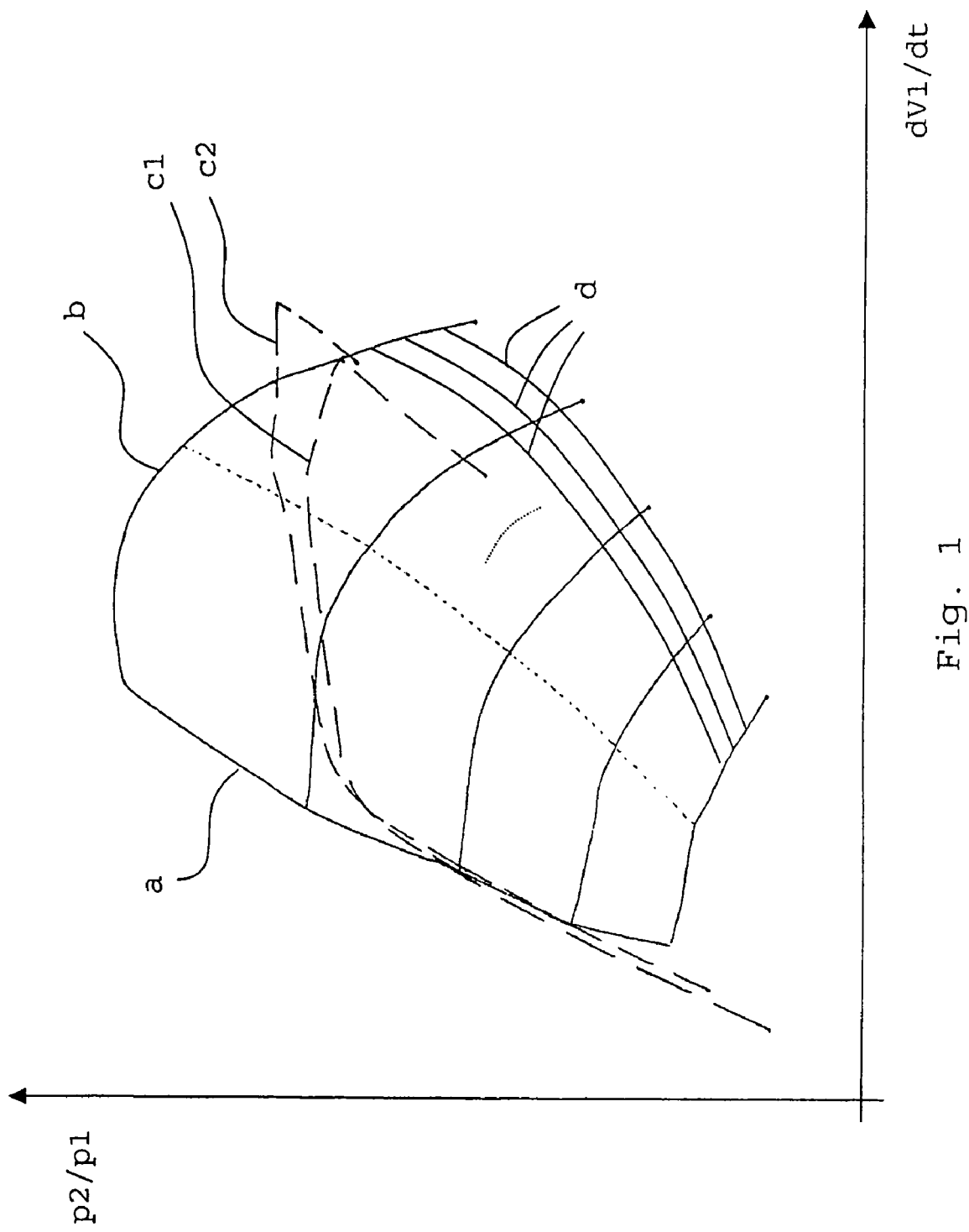
FIG. 1 shows schematically a basic compressor characteristic performance graph.

Functionally identical components are designated by the same reference numerals.

FIG. 1 shows a basic performance graph, of a compressor of an exhaust gas turbocharger. The air volume flow rate $dV1/dt$ into the compressor is plotted on the abscissa, and the ratio $p2/p1$ of boost pressure $p2$, i.e. the pressure downstream of the compressor in the direction of flow, to the pressure $p1$ upstream of the compressor in the direction of flow is plotted on the ordinate. This is a typical compressor performance graph or characteristic diagram, details of which have already been given in the introductory part of the description. The curve a designates the pumping limit, and the curve b designates the rotational speed limit of the exhaust gas turbocharger. The dashed curve c1 shows a typical operating curve for full-load operation at normal altitude and normal temperature. The dashed curve c2 shows, by way of example, an operating line at full-load under a peripheral condition which causes the rotational speed limit b of the supercharger to be exceeded and at which therefore the means for limiting the boost pressure according to the invention can and/or should be used to protect the exhaust gas turbocharger. The curves d are efficiency characteristic curves, referred to as efficiency shells. Only three of these efficiency curves are represented by way of example. The dotted curves are intended to indicate the presence of further efficiency curves.

Figure 2:
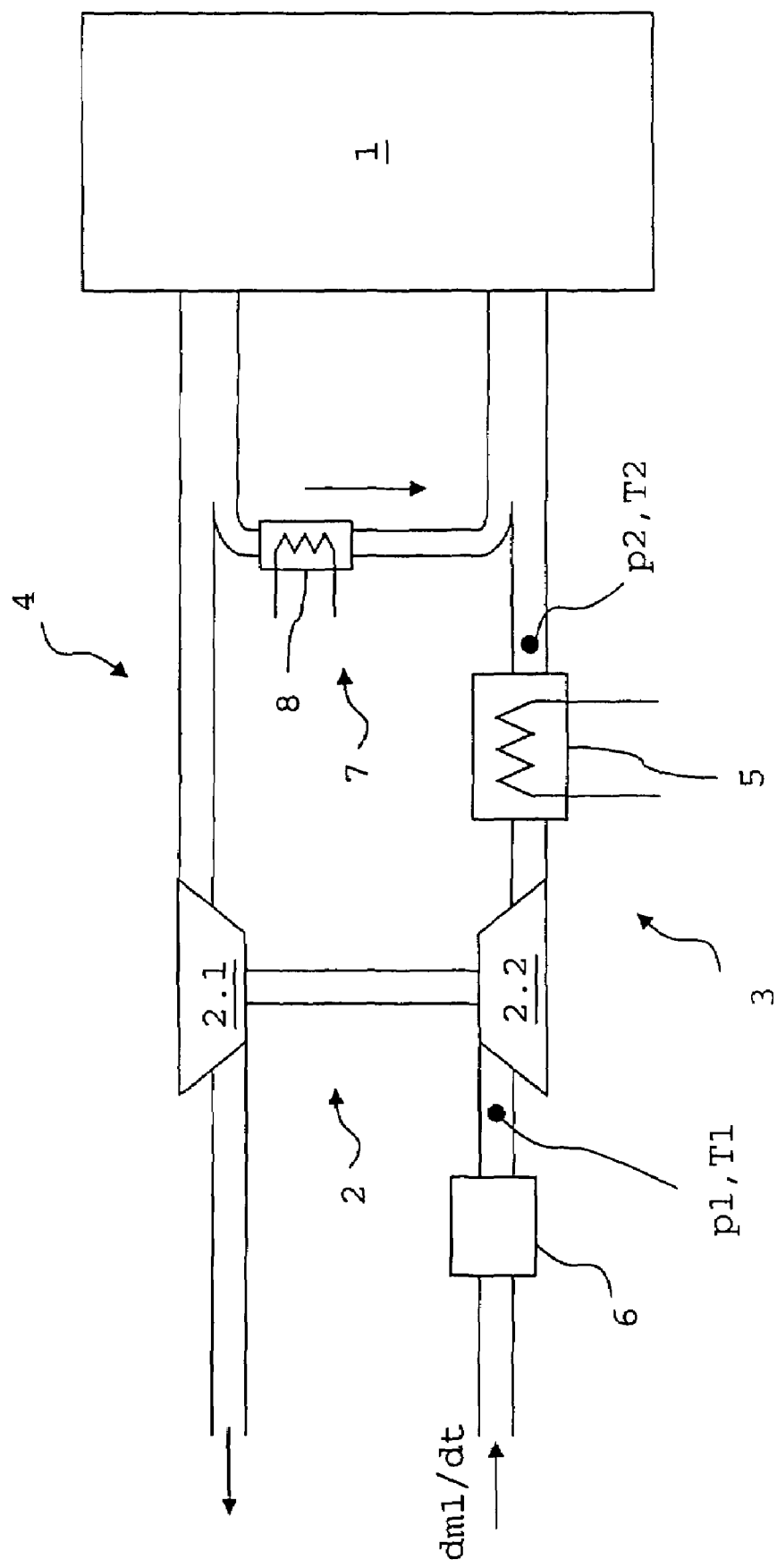
FIG. 2 shows schematically an internal combustion engine with an intake section, an exhaust section and an exhaust gas turbocharger.

FIG. 2 illustrates an internal combustion engine 1, to which gas or fresh air is fed via an intake section 3 and from which exhaust gas is discharged via an exhaust section 4. An exhaust gas turbocharger 2 is arranged in the exhaust section 4 or in the intake section 3, the turbine 2.1 of which is provided in the exhaust section 4, and the compressor 2.2 of which is provided in the intake section 3. A sensor 6, for example a hot-film air mass flow rate sensor (HFM) is arranged upstream of the compressor in the direction of flow in order to measure the air mass flow rate $dm1/dt$. Downstream of the compressor 2.2 in the direction of flow, a charge air cooler 5 is preferably arranged. It is possible to provide an exhaust gas recirculation means 7 which branches off from the exhaust section 4 upstream of the turbine 2.1 and is connected to the intake section 3 downstream of the charge air cooler 5. A cooler 8 is preferably arranged in the exhaust gas recirculation system or the exhaust gas recirculation line 7. The pressure $p1$ and the temperature $T1$ occur upstream of the compressor 2.2 in the direction of flow. The boost pressure $p2$ and the charge air temperature $T2$ occur downstream of the charge air cooler 5 in the direction of flow in the intake section 3.

According to the invention, the volume flow rate $dV1/dt$ through the compressor 2.2 is not determined from an air charge value characteristic curve or an air charge characteristic curve but rather reliably from measured variables. The signal of the air mass flow rate meter 6 is preferably used herefor, said air mass flow rate meter 6 being preferably arranged downstream of an air filter (not illustrated) and upstream of the compressor 2.2 in the direction of flow, and is preferably a hot-film air mass flow rate meter (HFM). The latter measures the air mass flow rate $dm1/dt$ into the compressor 2.2, which can be converted into the volume flow rate $dV1/dt$ through the compressor according to the gas equation $$dV1/dt = dm1/dt * R * T1/p1$$

using measured values and/or estimated values for the temperature $T1$ and the pressure $p1$, which occur upstream of the compressor in the direction of flow, as well as the gas constant $R$ for air. The temperature $T1$ and the pressure $p1$ are preferably determined by means of corresponding sensors (not illustrated) which are provided upstream of the compressor 2.2 in the intake section 3 and in particular near to the sensor. In this way, the actual volume flow rate $dV1/dt$ into the compressor, and thus the position on the abscissa of the compressor characteristic diagram (see FIG. 1) is sensed using measuring equipment. As a result, changes in the volume flow rate $dV1/dt$, due, for example, to a change in the charge of the internal combustion engine 1 and/or due to the exhaust gas recirculation system 7, are also reliably determined.

Figure 3:
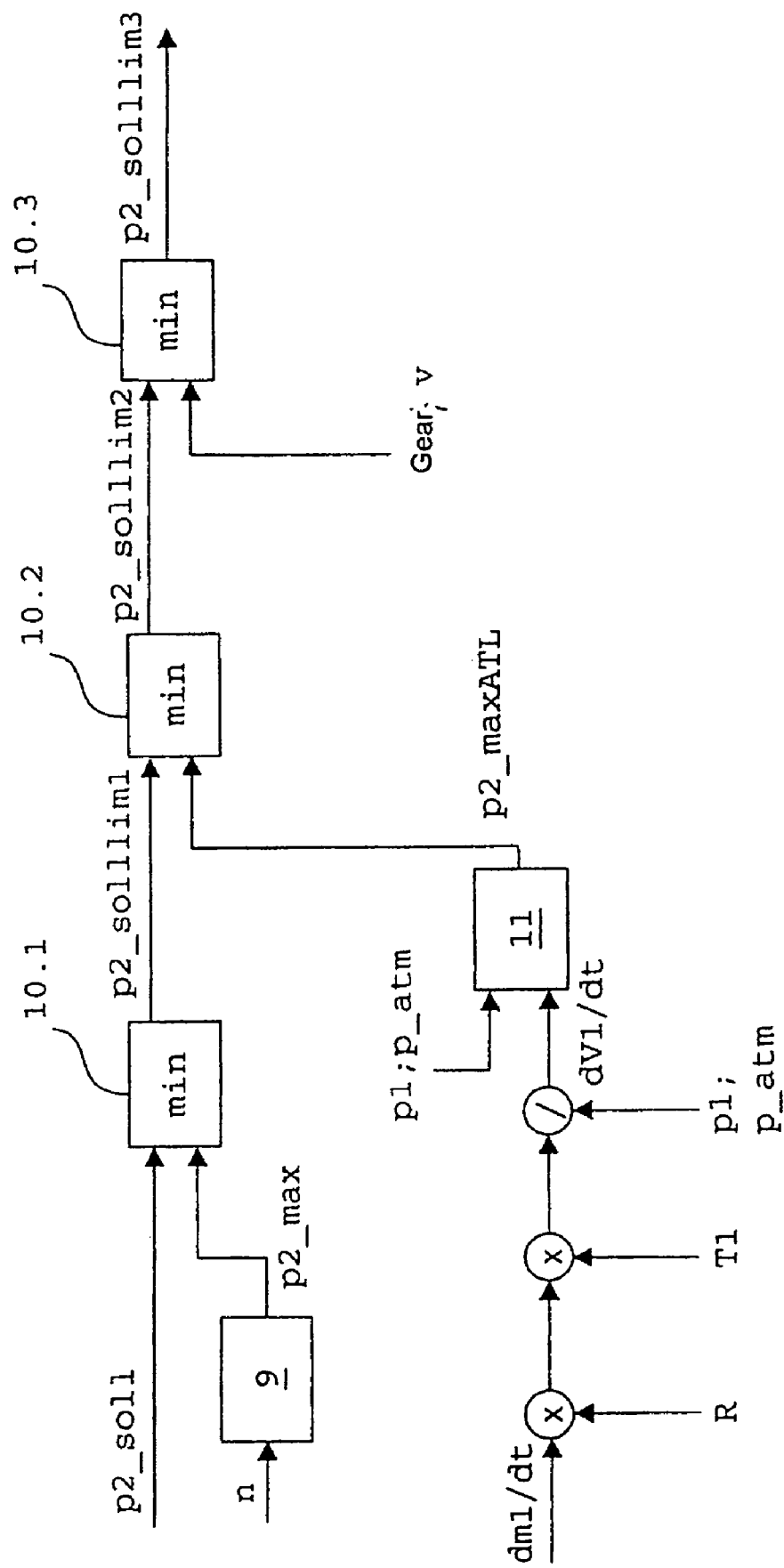
FIG. 3 shows a block diagram of a first embodiment of the method according to the invention.

FIG. 3 is a schematic illustration of the method according to the invention in the form of a block diagram. A desired boost pressure value $p2\_soll$ which is preferably stored in a basic performance graph in a control unit is compared with a maximum acceptable boost pressure $pt\_max$ in a function block 10.1. This maximum acceptable boost pressure value $p2\_max$ is obtained from a simulation model 9 whose input variable is the engine speed n. The simulation model 9 is preferably a characteristic curve. However, it may also be a mathematical or physical model, for example in the form of a differential equation or difference equation. A minimum value selection process takes place in the function block

10.1. The smaller of the two values p1_soll and p2_max forms the output variable pt_soll_liml of the function block 10.1.

According to the invention, a measured air mass flow rate dm1/dt, which may, of course, also be an estimated variable, is multiplied by the gas constant R for air and the measured or estimated temperature T1 which prevails upstream of the compressor in the direction of flow. The air mass flow rate dm1/dt is preferably processed in the unit [kg/h]. It can optionally be processed in an uncorrected form by matching the air mass flow rate signal to an injection quantity signal and the signal of a lambda probe (lambda correction) by means of what is referred to as a sensor or HFM drift correction (relating to sensor 6) and/or by means of a sensor or HFM correction (relating to sensor 6). The product of the air mass flow rate dm1/dt, gas constant R and temperature T1 is divided by the pressure p1 which prevails upstream of the compressor in the direction of flow to form the volume flow rate dV1/dt. Instead of the pressure p1 it is possible, for example if there is no sensor provided for this pressure or if this pressure cannot be determined for other reasons, to use an atmospheric pressure p_atm instead of the pressure p1.

The volume air flow rate dV1/dt and the pressure p1 upstream of the compressor (or if appropriate the atmospheric pressure p_atm) which are determined are fed as input variables to a simulation model 11. The output variable of the simulation model 11 forms a maximum acceptable boost pressure p2_maxATL which represents a limiting value and takes into account the pumping limit a and the rotational speed limit b for the exhaust gas turbocharger (see FIG. 1). The simulation model is preferably embodied as a characteristic diagram but it can also be embodied as a mathematical and/or physical model.

In a function block 10.2 a minimum value selection process takes place between the desired boost pressure value p2_solllim1 and the maximum acceptable boost pressure limiting value p2_maxATL. The smaller of these two values forms the output variable p2_solllim2 of the function block 10.2.

In a further function block 10.3, in which a minimum value selection also takes place, the desired value p2_solllim2 is preferably limited in a motor vehicle application as a function of an engaged gear (gear v) and/or the momentary velocity of the motor vehicle to form the output variable p2_solllim3 as a final, acceptable desired boost pressure.

Figure 4:
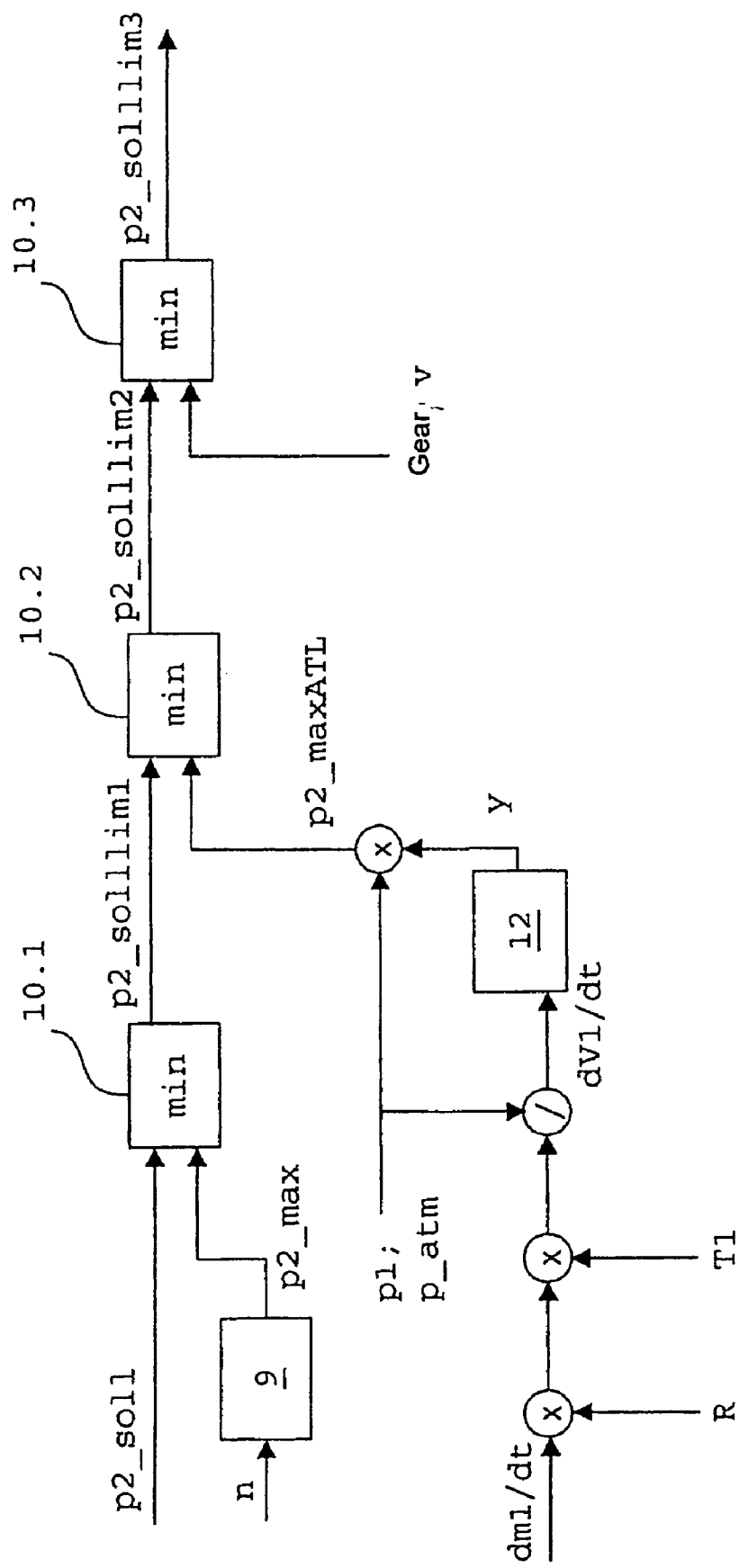
FIG. 4 shows a block diagram of a second embodiment of the method according to the invention.

FIG. 4 illustrates an alternative embodiment of the method according to the invention. The embodiments illustrated in FIG. 3 and FIG. 4 are equivalent both mathematically and physically. The block diagram illustrated in FIG. 4 corresponds very much to the block diagram illustrated in FIG. 3. Instead of the simulation model 11, however a simulation model 12 is provided. In contrast to the simulation model 11, the simulation model 12 advantageously has just one input variable, specifically the volume flow rate dV1/dt. As a result, the dimension of the simulation model 12 (for example a characteristic curve with two-dimensional data) is one smaller than the dimension of the simulation model 11 (corresponding to the above example for the simulation model 12, for example a characteristic diagram with three-dimensional data). The output variable y of the simulation model 12 corresponds to the ratio of the maximum acceptable boost pressure p2_maxATL to the pressure p1 upstream of the compressor in the direction of flow, at which the pumping limit and rotational speed limit for the exhaust gas turbocharger are not exceeded. In order to form the maximum acceptable boost pressure p2_maxATL, the output variable y is also multiplied by the pressure p1 upstream of the compressor. If the pressure p1 cannot be measured or estimated, for example because no sensor for determining the pressure p1 is provided in the intake section and/or no estimation method is stored in a control device which is assigned to the internal combustion engine, it is possible to use the atmospheric pressure p_atm instead of the pressure p1.

The boost pressure limitation which is provided according to the method in accordance with the invention is characterized by high quality because of the exclusion of inaccuracies such as, for example, variations between different internal combustion engines and ageing effects. This results in corresponding advantages for the resulting torques and powers of the internal combustion engine. The method according to the invention is advantageously suitable for operation with a soot filter in the exhaust section and for operation with full-load exhaust gas recirculation.

The boost pressure p2 can be measured downstream of the compressor or upstream of the charge air cooler viewed in the direction of flow. For this purpose, only one corresponding sensor would have to be provided at a suitable location.

In a further, particularly preferred embodiment of the invention, the simulation models 11 and 12 (see FIGS. 3 and 4) are dependent on the temperature T1 which occurs upstream of the compressor in the intake section viewed in the direction of flow.

The temperature T1 therefore constitutes an additional input variable or influencing variable for the simulation models 11 and 12. For this purpose, the simulation model 11, which has two input variables, is preferably embodied as a group of characteristic diagrams which is subject to parameters, with the temperature T1 serving as a parameter. The output variable of the simulation model 11 is the maximum acceptable desired boost pressure p2_maxATL. The simulation model 11 is then characterized by the additional influence of the temperature T1 as a result of four-dimensionality.

In the embodiment of the method according to the invention which is illustrated in FIG. 4, the simulation model 12 is preferably embodied as a group of characteristic curves or as a corresponding performance graph which is subject to parameters, in order to take into account the temperature T1 which occurs upstream of the compressor viewed in the direction of flow serving as a parameter. The simulation model 12 is then characterized by the additional influence of the temperature T1 only as a result of three-dimensionality. The embodiment of the method according to the invention which is based on the simulation model 12 is, for this reason, more advantageous and simpler, for example can be implemented better in a control device than an embodiment of the method according to the invention which is based on the simulation model 11. For just this reason, the embodiment of the method according to the invention which is illustrated in FIG. 4, using the additional input variable T1, forms the preferred embodiment.

The output variable of the simulation model 12 is the ratio of the maximum acceptable boost pressure p2_maxATL to the pressure p1 occurring upstream of the compressor in the direction of flow. The characteristic curve p2/p1=f(dV1/dt) of the simulation model 12 therefore becomes a characteristic diagram p2/p1=f(dV1/dt, T1) as a result of the further input variable or the parameter T1, with "f" being understood as meaning "function of".

In this way, at a cooler temperature T1 the boost pressure can actually be increased until the rotational speed limit of the exhaust gas turbocharger is reached. The boost pressure—and thus the torque of the internal combustion engine—beyond this limit only needs to be limited at such temperatures T1 at which otherwise a maximum acceptable or critical charge air temperature T2 would be exceeded. For "normal" temperatures, it is possible to fully utilize, in a way which is optimum for torque and power, the boost pressure which is the maximum acceptable one for the exhaust gas turbocharger for reasons of the rotational speed of the exhaust gas turbocharger.

For high temperatures with the risk of damage to the materials, in particular the elastomer hoses which are, if appropriate, provided between the compressor and charge air cooler, but also to the compressor itself, the invention correspondingly reduces the maximum acceptable boost pressure. With the method according to the invention there is therefore no need to impose a limitation on the boost pressure—which is effective even at moderate temperatures and thus wastes torque and power—for safety reasons for situations of extremely hot intake air temperatures T1—such limitation would otherwise have to be imposed in order to protect the materials or elastomer hoses between the compressor and charge air cooler or else to protect the compressor itself—because the temperature influence of the intake air temperature T1 is taken into account by the method according to the invention and/or the simulation models 11 and 12 and a corresponding limitation is thus active only at correspondingly high temperatures T1.

What is claimed is:

1. A method for limiting a boost pressure (p2) of an internal combustion engine (1) which is supercharged by means of an exhaust gas turbocharger (2) including a compressor (2.2), said method comprising the steps of: comparing a desired boost pressure value (p2_soll, p2_solllim1) with a predefined limiting value (p2_maxATL) and, when the desired value (p2_soll, p2_solllim1) exceeds the limiting value (p2_maxATL), limiting the desired value (p2_soll) to the predefined limiting value (p2_maxATL), determining the limiting value (p2_maxATL) as a function of an existing operating state (n) of the internal combustion engine (1) and also a temperature (T1) and a pressure (p1) which occur upstream of the compressor (2.2) of the exhaust gas turbocharger (2) in the through-flow direction, additionally using a air mass flow rate (dm1/dt) which occurs upstream of the compressor (2.2) in the throughflow direction for determining the limiting value (p2_maxATL) by means of a simulation model (11, 12), said simulation model (12) being provided as a group of characteristic curves which is subject to parameters, with the ratio of the limiting value (p2_maxATL) to the pressure (p1) occurring upstream of the compressor (2.2) in the direction of flow being an output variable, and the temperature (T1) occurring upstream of the compressor (2.2) in the direction of flow serving as a parameter.

2. The method as claimed in claim 1, wherein the simulation model (11) is in the form of a characteristic diagram having an output variable forming the limiting value (p2_maxATL).

3. The method as claimed in claim 2, wherein the simulation model (12) is in the form of a characteristic curve having an output variable forming a relationship between the limiting value (p2_maxATL) and the pressure (p1) occurring upstream of the compressor (2.2) in the direction of flow.

4. The method as claimed in claim 3, wherein the simulation model (11) is in the form of a group of characteristic diagrams which is subject to parameters, with the limiting value (p2_maxATL) being an output variable and the temperature (T1) occurring upstream of the compressor (2.2) in the direction of flow serving as a parameter.

\* \* \* \* \*